(12) United States Patent
Svoboda et al.

(10) Patent No.: US 9,407,721 B2
(45) Date of Patent: Aug. 2, 2016

(54) SYSTEM AND METHOD FOR SERVER SELECTION USING COMPETITIVE EVALUATION

(71) Applicant: Red Hat, Inc., Raleigh, NC (US)

(72) Inventors: Rostislav Svoboda, Šlapanice (CZ); Pavel Slavíček, Brno (CZ); Filip Eliáš, Vysni Lhoty (CZ)

(73) Assignee: Red Hat, Inc., Raleigh, NC (US)

( * ) Notice: Subject to any disclaimer, the term of this patent is extended or adjusted under 35 U.S.C. 154(b) by 274 days.

(21) Appl. No.: 14/055,146

(22) Filed: Oct. 16, 2013

(65) Prior Publication Data
US 2015/0106422 A1    Apr. 16, 2015

(51) Int. Cl.
*G06F 15/16* (2006.01)
*H04L 29/08* (2006.01)
*G06F 15/173* (2006.01)

(52) U.S. Cl.
CPC ............ *H04L 67/32* (2013.01); *H04L 67/1004* (2013.01); *H04L 67/1025* (2013.01)

(58) Field of Classification Search
CPC .. H04L 67/32; H04L 67/1004; H04L 67/1025
See application file for complete search history.

(56) References Cited

U.S. PATENT DOCUMENTS

| | | | |
|---|---|---|---|
| 6,829,638 B1 * | 12/2004 | McBrearty | H04L 67/1008 709/203 |
| 7,870,568 B2 | 1/2011 | Bernardin et al. | |
| 8,185,909 B2 | 5/2012 | Sigal et al. | |
| 8,392,912 B2 | 3/2013 | Davis et al. | |
| 2010/0107172 A1 | 4/2010 | Calinescu et al. | |
| 2010/0223364 A1 * | 9/2010 | Wei | H04L 29/04 709/220 |
| 2014/0047104 A1 * | 2/2014 | Rodriguez | H04L 67/1008 709/224 |
| 2014/0143415 A1 * | 5/2014 | Kazerani | H04L 43/0811 709/224 |

FOREIGN PATENT DOCUMENTS

WO    WO 2006/004995 A2    1/2006

OTHER PUBLICATIONS

Stansberry, B., et al., "JBoss Application Server Clustering Guide," http://docs.jboss.org/jbossas/docs/Clustering_Guide/4/html-single/, Retrieved Oct. 16, 2013, 75 pages.

(Continued)

*Primary Examiner* — Wen-Tai Lin
(74) *Attorney, Agent, or Firm* — Haynes & Boone LLP

(57) ABSTRACT

A system and method of server selection using competitive evaluation includes receiving a service request at an arbiter running on a computing device, determining whether the service request is associated with a preferred server, and forwarding the service request to the preferred server when the service request is associated with the preferred server. When the service request is not associated with the preferred server, the method further includes using the arbiter to coordinate a competitive evaluation among a plurality of active servers, selecting as the preferred server a first one of the active servers that completes processing of the service request first, and associating the preferred server with the service request. The method further includes receiving a response to the service request from the preferred server and returning the response to a client. The service request is received from the client.

20 Claims, 7 Drawing Sheets

(56) References Cited

OTHER PUBLICATIONS

IBM Info Center, "Introducing WebSphere Application Server Edge Components," http://pic.dhe.ibm.com/infocenter/wasinfo/v7r0/index.jsp?topic=%2Fcom.ibm.websphere.edge.doc%2Fconcepts%2Fconcepts06.htm , Retrieved Oct. 16, 2013, 4 pages.

Tesauro, G., et al., "A Hybrid Reinforcement Learning Approach to Autonomic Resource Allocation," IEEE International Conference on Autonomic Computing, 2006. ICAC '06, Jun. 13-16, 2006, pp. 65-73, 9 pages total.

Quiroz, A., et al., "Towards Autonomic Workload Provisioning for Enterprise Grids and Clouds," Dept. of Electr. & Computer Eng., Rutgers, State Univ. of New Jersey, Piscataway, Oct. 13-15, 2009, pp. 50-57, 8 pages total.

Stansberry, B., et al., "High Availability Enterprise Services with JBoss Application Server Clusters," http://docs.jboss.org/jbossclustering/cluster_guide/5.1/pdf/Clustering_Guide.pdf , Retrieved Oct. 16, 2013, 162 pages.

\* cited by examiner

SYSTEM AND METHOD FOR SERVER SELECTION USING COMPETITIVE EVALUATION

BACKGROUND

The present disclosure relates generally to computing systems, and more particularly to server selection using competitive evaluation.

As the value and use of information continues to increase, individuals and businesses seek additional ways to process and store information. One option is a computing system. Computing systems may vary in complexity from a single processor operating in relative isolation to large networks of interconnected processors. The interconnected processors may be in close proximity to each other or separated by great distances both physically and as distance is measured in computer networking terms. The interconnected processors may also work together in a closely cooperative fashion or in a loose weakly coupled fashion. Because technology and processing needs and requirements may vary between different applications, the structure and arrangement of the computing system may vary significantly between two different computing systems. The flexibility in computing systems allows them to be configured for both specific users, specific uses, or for more general purposes. Computing system may also include a variety of hardware and software components that may be configured to process, store, and communicate information based on the needs of the users and the applications.

Additionally, some examples of computing systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computers, processors, and software systems often share information and provide computing services for each other. In order to do so, a server or some other computing system may provide an interface through which service requests are made by the other computing devices or clients. In these service-oriented architectures (SOAs), the clients generally make a service request by sending a request message to the server hosting the service using, for example, a networking protocol. The server receives the message, activates the requested service, and returns a response message with the result. For example, a very basic form of services is demonstrated by a request for a web page. A client, such as a web browser, sends a Hypertext Transport Protocol (HTTP) request to a web server which receives the HTTP request and generates a response containing the requested web page, that is then returned to the web browser.

Most computing systems and clients have access to many servers providing a large array of services that the clients are able to use. This client-server approach, however, does not generally include overt handling of load-related issues. For example, when clients are able to freely select the servers which provide each of the requested services, there are often few controls and/or management mechanisms that prevent and/or limit service requests from being concentrated in one or more servers, which may become overloaded with service requests and then may become correspondingly less responsive in processing those service requests. This may be further exacerbated by the use of distributed processing to handle each service request where one server relies on other servers, and the services they provide, to process a service request.

Accordingly, it would be desirable to provide improved systems and methods for managing the selection of a server for the handling of a service request.

SUMMARY

According to one example, a method of processing a service request includes receiving the service request at an arbiter running on a computing device, determining whether the service request is associated with a preferred server, and forwarding the service request to the preferred server when the service request is associated with the preferred server. When the service request is not associated with the preferred server, the method further includes using the arbiter to coordinate a competitive evaluation among a plurality of active servers, selecting as the preferred server a first one of the active servers that completes processing of the service request first, and associating the preferred server with the service request. The method further includes receiving a response to the service request from the preferred server and returning the response to a client. The service request is received from the client.

According to another example, a system for processing service requests includes a computing device comprising one or more processors coupled to memory and an arbiter stored in the memory and executed by the one or more processors. The computing device is configured to communicate with a client and a plurality of active servers. The arbiter is configured to receive a service request from the client, determine whether the service request is associated with a preferred server. And forward the service request to the preferred server when the service request is associated with the preferred server. When the service request is not associated with the preferred server, the arbiter is further configured to coordinate a competitive evaluation among the plurality of active servers, select as the preferred server a first one of the active servers that completes processing of the service request first, and associate the preferred server with the service request. The arbiter is further configured to receive a response to the service request from the preferred server and return the response to the client.

According to yet another example, a non-transitory machine-readable medium comprising a first plurality of machine-readable instructions which when executed by one or more processors associated with an arbiter are adapted to cause the one or more processors to perform a method including receiving a first request from a client, determining whether the first request is associated with a first server by matching one or more properties of the first request to a corresponding one or more fields of a server record associated with the first server, and forwarding the first request to the first server when the first request is associated with the first server. When the first request is not associated with the first server, the method further includes using the arbiter to coordinate a competitive evaluation among a plurality of second servers, selecting as the first server a first one of the second servers that completes handling of the first request before any other of the second servers, and associating the first server with the first request. The method further includes receiving a response to the first request from the first server and returning the response to the client.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
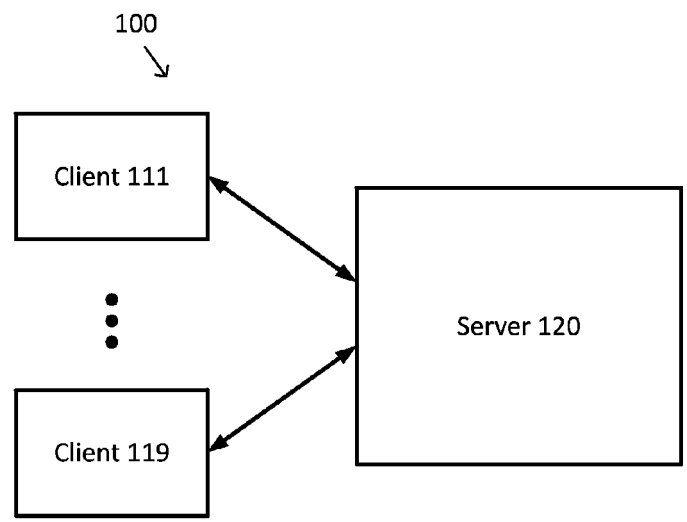
FIG. 1 is a simplified diagram of a service-oriented architecture (SOA) according to some examples.

FIG. 1 is a simplified diagram of a service-oriented architecture (SOA) 100 according to some examples. As shown in FIG. 1, SOA 100 is built around a client-services model. In SOA 100, service requests originate from one or more clients 111-119. Each of the clients 111-119 may make service requests that are being hosted by a server 120. Each of the clients 111-119 may transmit one or more service request messages to server 120, which may in turn direct each of the service requests to the service identified in the respective service request. Numerous mechanisms for directing the service requests to the respective service may be used including providing a uniform resource locator (URL) for the service in the respective service request, providing a service name of the service in the respective service request, and/or the like. The service requests may also be made using protocols such as remote procedure call, web services, and/or the like. In some examples, clients 111-119 may use one or more networks (not shown) to route service requests to server 120.

In some examples, client-server models, like those shown in SOA 100, often include a limited ability to monitor and/or manage the workload of server 120. In some examples, server 120 may accept service requests until server 120 no longer has sufficient computing, memory, and/or other resources to continue handling further service requests. In some examples, server 120 may become less responsive as it is called upon to handle more and more service requests. In some examples, server 120 may reach a point where server 120 may have no choice but to ignore one or more new service requests and/or drop one or more service requests already being processed. In some examples, server 120 may use a priority-based system for selecting the service requests to handle and the service requests to ignore and/or drop. In some examples, this approach may not be very client-friendly as clients are left either to wonder why a request for service has not received a response and/or are forced to delay until the server has sufficient resources to complete the service requests.

Figure 2:
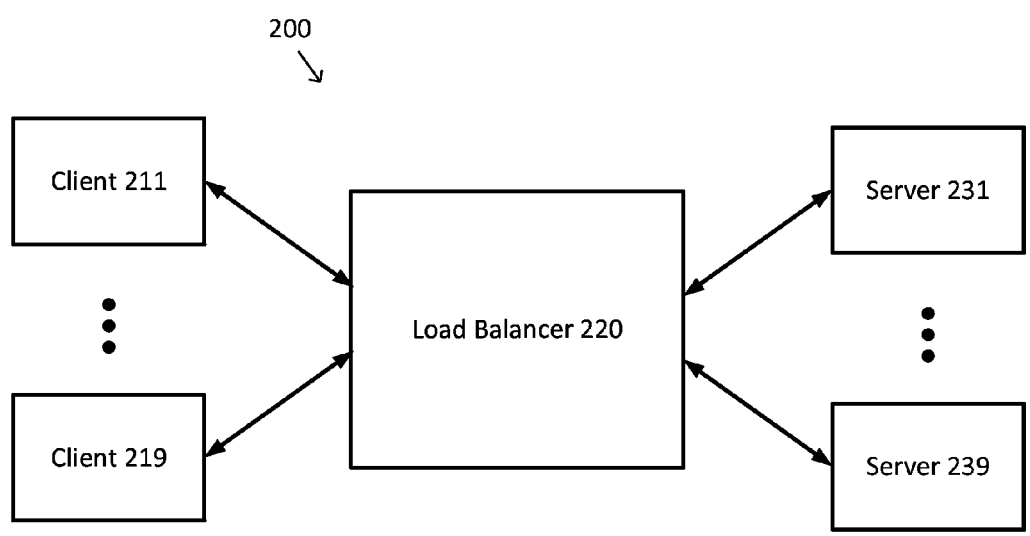
FIG. 2 is a simplified diagram of a load-balancing SOA according to some examples.

FIG. 2 is a simplified diagram of a load-balancing SOA 200 according to some examples. As shown in FIG. 2, SOA 200 employs a more sophisticated approach to monitoring and/or managing server workload than does SOA 100. Like SOA 100, SOA 200 includes one or more clients 211-219. In some examples, the clients 211-219 may by similar to clients 111-119. However, unlike SOA 100, SOA 200 includes a load balancer 220 as well as one or more servers 231-239. SOA 200 uses load balancer 220 to monitor the workload of each of the servers 231-239 to better manage the workload of each of the servers 231-239 in an effort to make the servers 231-239 more responsive to service requests. In some examples, load balancer 220 may monitor the workload of each of the servers 231-239 in order to evaluate how busy each of the servers 231-239 may be. In some examples, load balancer 220 may monitor processor usage, memory usage, and/or other workload indicators for each of the servers 231-239.

Load balancer 220 may further act as a dispatcher for each of the servers 231-239. Rather than make service requests directly to servers 231-239, the clients 211-219 may make their service requests through load balancer 220. As load balancer 220 receives service requests from clients 211-219, load balancer 220 may examine each of the service requests and then direct the service requests to one or more of the servers selected from servers 231-239 based on the monitored workloads of the servers 231-239 and/or one or more priority schemes. In some examples, the priority schemes may include round-robin, weighted round-robin, and/or other strategies. This may allow load balancer 220 to direct service requests to servers with lighter workloads with the assumption being that servers with lighter workloads are more likely to be able to generate a response in a shorter period of time.

Load balancer 220, however, is limited in its ability to fully evaluate the responsiveness of each of the servers 231-239. Load balancer 220 is typically limited to monitoring and/or evaluating resource usage of the servers 231-239 in isolation. Most servers are typically able to provide resource usage information for the resources under the direct control of the individual server. Thus, each server may only be able to provide information on its own processor usage, memory usage, and/or the like. This approach, however, may not account for each of the resources that each server may be dependent on. Each of the servers 231-239 may be reliant on other servers in order to handle service requests. In some examples, any of the servers 231-239 may make one or more service requests to other servers when handling a service request. In some examples, the other servers may include database servers, messaging servers, distributed storage systems, and/or the like. Without evaluating the responsiveness of these other servers, it is generally not possible to predict how responsive any given server may be to a service request. As an example, a server with low processor and memory usage may appear to be a good candidate to rapidly handle a service request, but because that server may be more remotely located in a network, it may ultimately take longer to handle the service request than a more centrally located server, even when the more centrally located server has a higher apparent workload. Thus, it may be valuable to examine the overall responsiveness of a server to a request for a particular service before directing future service requests for that particular service to the server.

Figure 3:
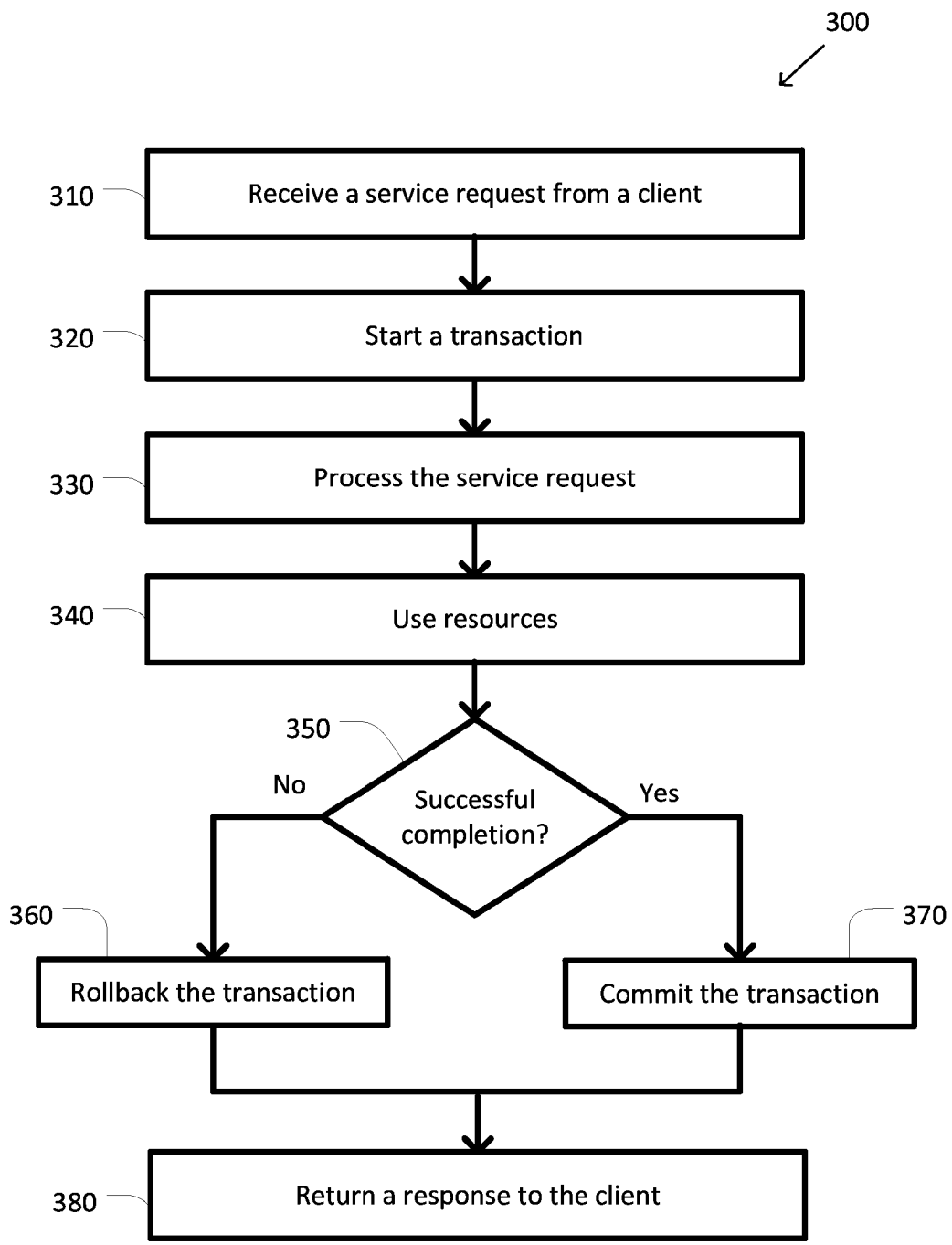
FIG. 3 is a simplified diagram of a method of handling a service request according to some examples.

To better understand how the overall responsiveness of a server may be to a service request, it is helpful to know how service requests are typically handled. FIG. 3 is a simplified diagram of a method 300 of handling a service request according to some examples. In some examples, one or more of the processes 310-380 of method 300 may be implemented, at least in part, in the form of executable code stored on non-transient, tangible, machine readable media that when run by one or more processors (e.g., one or more processors in any of the servers 120 and/or 231-239) may cause the one or more processors to perform one or more of the processes 310-380. In some examples, method 300 may be implemented by an application server being hosted on any of the servers 120 and/or 231-239.

At a process 310, a service request is received from a client. In some examples, the service request may be received by an application server running on a server. In some examples, the server may be any of the servers 120 and/or 231-239. In some examples, the service request may be received from a client of the application server, such as any of the clients 111-119 and/or 211-219, whether or not the service request is dispatched through a load balancer. In some examples, the request for service may be received over a network. In some examples, the service request may be identified by a name and/or a uniform resource locator (URL). In some examples, the service request may ask the application server to execute a service using one or more parameters and/or data included in the service request.

At a process 320, a transaction is started. To avoid conflicts that may arise due to parallel processing, many application servers typically wrap a service request within a transaction. This may help to avoid over-committing a limited resource. As an example, transactions may typically be used to avoid selling the same seat at a concert to more than one purchaser even though the seat selling system may be selling seats simultaneously to multiple purchasers. In some examples, the transaction helps ensure that mutually dependent processing is all able to successfully complete. Using the example of the concert seat, this may include removing the seat from inventory, issuing the ticket to the purchaser, and receiving payment. If all three of these mutually dependent processings are not able to successfully complete, none of them should be allowed to complete. In some examples, the transaction may be managed by a transaction processor. In some examples, the transaction may be started by making an application programming interface (API) call, a remote procedure call, a service request, and/or the like to the transaction processor. In some examples, the transaction processor may implement a transaction API, such as the Java Transaction API.

At a process 330, the service request is processed. The service request received during process 310 is evaluated by the application server and the requested service is executed by the application server using the data and/or parameters, if any, included in the service request.

At a process 340, resources are used. As the application server processes the service request during process 330, zero or more resources may be used. In some examples, the resources may be limited to local resources available on the server hosting the application server. In some examples, the local resources may include processing time, memory, and/or other local hardware and/or software resources. In some examples, the resources may additionally include remote resources provided by other servers. In some examples, the remote resources may include database services, messaging services, storage, and/or the like.

At a process 350, it is determined whether the service request is successfully completed. In some examples, it may not be possible to fully complete the processing of the service request because of the unavailability of resources, including limited resources. In some examples, it may not be possible to fully complete the processing of the service request because one or more of a plurality of mutually dependent processing may not complete. In some examples, it may not be possible to fully complete the processing of the service request because the service request itself may not be fully satisfied. When the service request is not successfully completed, the transaction is rolled back using a process 360. When the service request is successfully completed, the transaction is committed using a process 370.

At the process 360, the transaction is rolled back. Because the service request may not be successfully completed, the transaction started during process 320 is rolled back. In some examples, some of the processing performed during processes 330 and/or 340 is reversed and/or rolled back to limit the likelihood of inconsistencies. As an example, a "sale" of a concert ticket to a purchaser may be rolled back when a corresponding payment request is denied so that the concert ticket may be purchased by someone else. As another example, when a "purchased" concert ticket is not available (e.g., because a hold period is expired), any payment request that is pending should be withdrawn. Once the transaction is rolled back, a response to the service request is returned to the client using a process 380.

At the process 370, the transaction is committed. When the service request is successfully completed, the processing for the service is finalized as part of the committing of the transaction started during process 320. This helps ensure that each of the plurality of mutually dependent processings is guaranteed to finish. Once the transaction is committed, the response to the service request is returned to the client using the process 380.

At the process 380, the response is returned to the client. Whether or not the transaction wrapped around the service request is committed or rolled back, the application server generates a response that is returned to the client. This informs the client of the final result and/or final status of the service request sent from the client during process 310. When the transaction is rolled back using process 360, the response may include an error and/or other status message. When the transaction is committed using process 370, the response may include the results of the service request.

Figure 4:
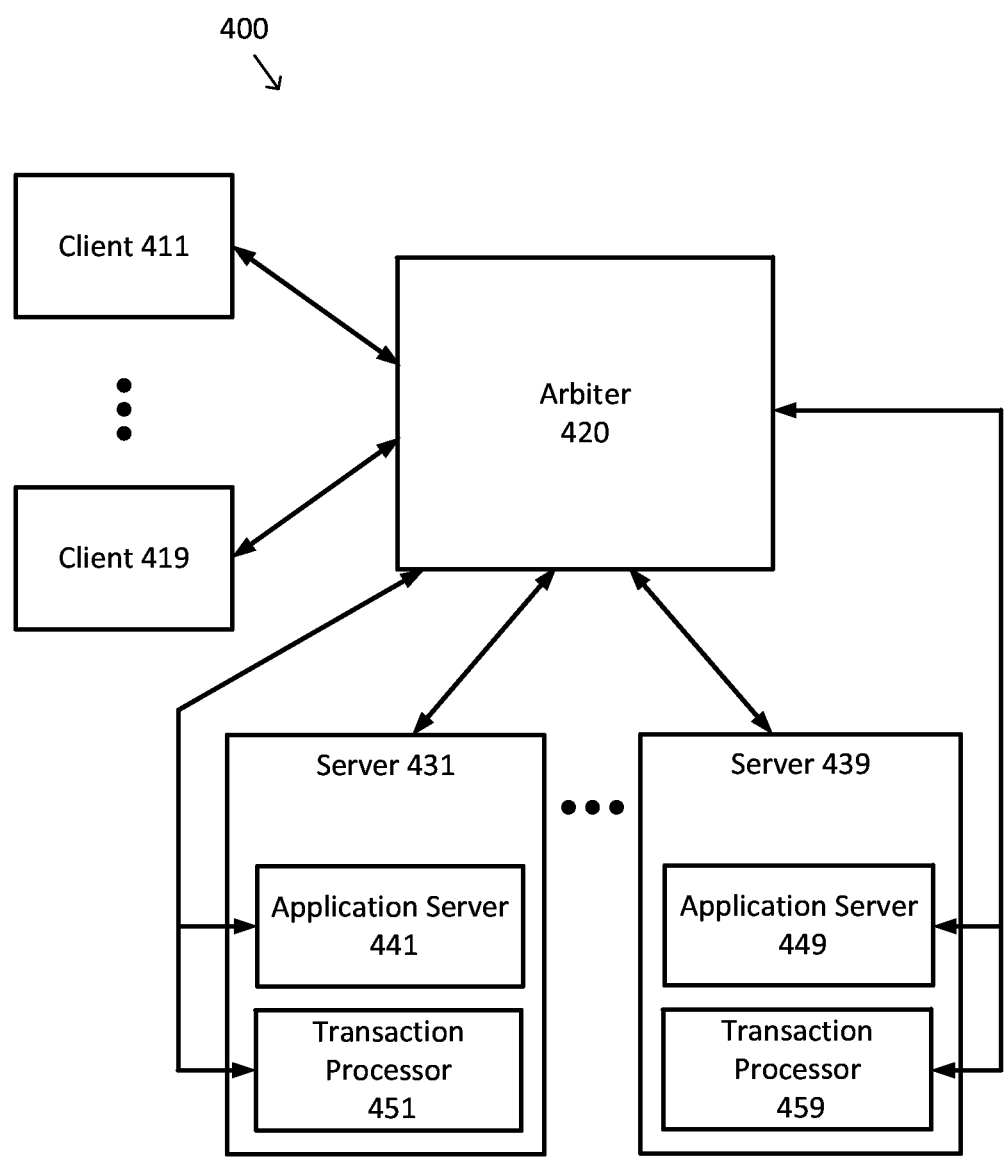
FIG. 4 is a simplified diagram of an arbiter-based SOA according to some examples.

FIG. 4 is a simplified diagram of an arbiter-based SOA 400 according to some examples. As shown in FIG. 3, SOA 400 is built around a client-server model. Like SOAs 100 and 200, SOA 400 is able to receive service requests from one or more clients 411-419. In some examples, any of clients 411-419 may be similar to clients 111-119 and/or 211-219. SOA 400 further includes an arbiter 420 and one or more servers 431-439. Rather than make their service requests directly to the servers 431-439, the clients 411-419 make their service requests through arbiter 420.

Arbiter 420 is designed to receive service requests from the clients 411-419 and direct them to one of the servers 431-439 for processing. Rather than use the load balancing model of SOA 200 that is designed to balance the load across servers 431-439, arbiter 420 selects a preferred server from among servers 431-439 that arbiter 420 believes is likely to be the most responsive to the service request. In order to determine the responsiveness of the servers 431-439 to particular service requests, arbiter 420 is using a competitive evaluation approach. More specifically, when arbiter 420 receives a service request from one of the clients 411-419 that has not been recently evaluated, arbiter 420 forwards the service request to two or more of the servers 431-439, in parallel, and then monitors to see which of the servers 431-439 is able to complete the request in the shortest period of time. The server that completes the request in the shortest period of time becomes the preferred server for the evaluated service. Thus, the servers 431-439 are competitively evaluated to determine the preferred server. The preferred server is then recorded so that future service requests for that service are preferably directed to the preferred server until another competitive evaluation takes place. By using a competitive evaluation of the servers 431-439 to determine the preferred server, arbiter 420 is able to account for not only the relative workload of each of the servers 431-439, but it can also take into account the effects on responsiveness due to the use of resources that are not part of the respective server. This allows arbiter 420 to more holistically evaluate the ability of each of the servers 431-439 to handle the service request.

According to some examples, arbiter 420 may monitor the completion time of each of the servers 431-439 involved in a competitive evaluation by coordinating with a respective application server 441-449 and/or a respective transaction processor or transaction manager 451-459 in each of the servers 431-439. As discussed above with respect to FIG. 3, servers 431-439 are each typically managing the service requests they receive using the respective application server 441-449. These application servers 441-449 are also typically wrapping each service request in a transaction. In some examples, each of these transactions may be managed by the respective transaction processor 451-459. By monitoring when the transaction processers 451-459 receive rollback and/or commit requests from the application servers 441-449, arbiter 420 may be able to determine which of the servers 431-439 involved in the competitive evaluation is able to complete the service request first. Thus, arbiter 420 may identify the preferred server. Use of the transaction processors 451-459 also helps arbiter 420 address potential undesired side-effects that may occur as a result of the parallel processing of the same service request in more than one of the servers 431-439. As each of the parallel service requests that are part of the competitive evaluation complete and request either a rollback or a commit from the respective transaction processor 451-459 in the corresponding server 431-439, the respective transaction processor 451-459 may notify arbiter 420 and request confirmation from arbiter 420 before allowing the rollback or commit to complete. This enables arbiter 420 to allow the preferred server to commit its transaction and then further allows arbiter 420 to block the other servers from committing their respective transactions, thus forcing the other servers to rollback their transactions and the related processing. The helps address any issues that may result from multiple servers processing the same service request in parallel.

In a typical design for a transaction processor, decisions regarding whether to allow rollbacks and/or commits are generally handled by the transaction processor alone. To support the monitoring of transactions by arbiter 420 and/or to give arbiter 420 the ability to supervise rollbacks and/or commits, the application servers 441-449 and/or transaction processors 451-459 in servers 431-439 are generally enhanced. In some examples, each of the application servers 441-449 may be enhanced to add a competitive evaluation resource to the end of each service request. As each of the service requests finishes in the respective application server 441-449, the competitive evaluation resource is used to handle the rollback and/or commit request. The competitive evaluation resource may then notify arbiter 420 for the rollback and/or commit request and receive instructions from arbiter 420 on whether to allow the commit request or whether a rollback should be forced. In some examples, aspect-oriented programming (AOP) technologies, such as the AOP features of the Java programming language, may be used to insert the competitive evaluation resource at the end of each transaction. In some examples, a transaction processor that supports customization of the rollback and commit operations may be used to add the monitoring and/or supervision of the rollback and commit requests. In some examples, the Open XA architecture of the Java Transaction API may be used to insert, at run time, a competitive evaluation resource into the rollback and/or commit request handling that may involve arbiter 420 in rollback and/or commit decision making and handling.

As discussed above and further emphasized here, FIG. 4 is merely an example which should not unduly limit the scope of the claims. One of ordinary skill in the art would recognize many variations, alternatives, and modifications. In some examples, the servers 431-439 and/or arbiter 420 may share one or more transaction processors. As long as each of the transaction processors coordinates with arbiter 420 before allowing a transaction to either rollback or commit, arbiter 420 may monitor any ongoing competitive evaluation, determine a corresponding preferred server, and/or correct for any issues associated with the parallel processing of the same service request by multiple servers.

Figure 5:
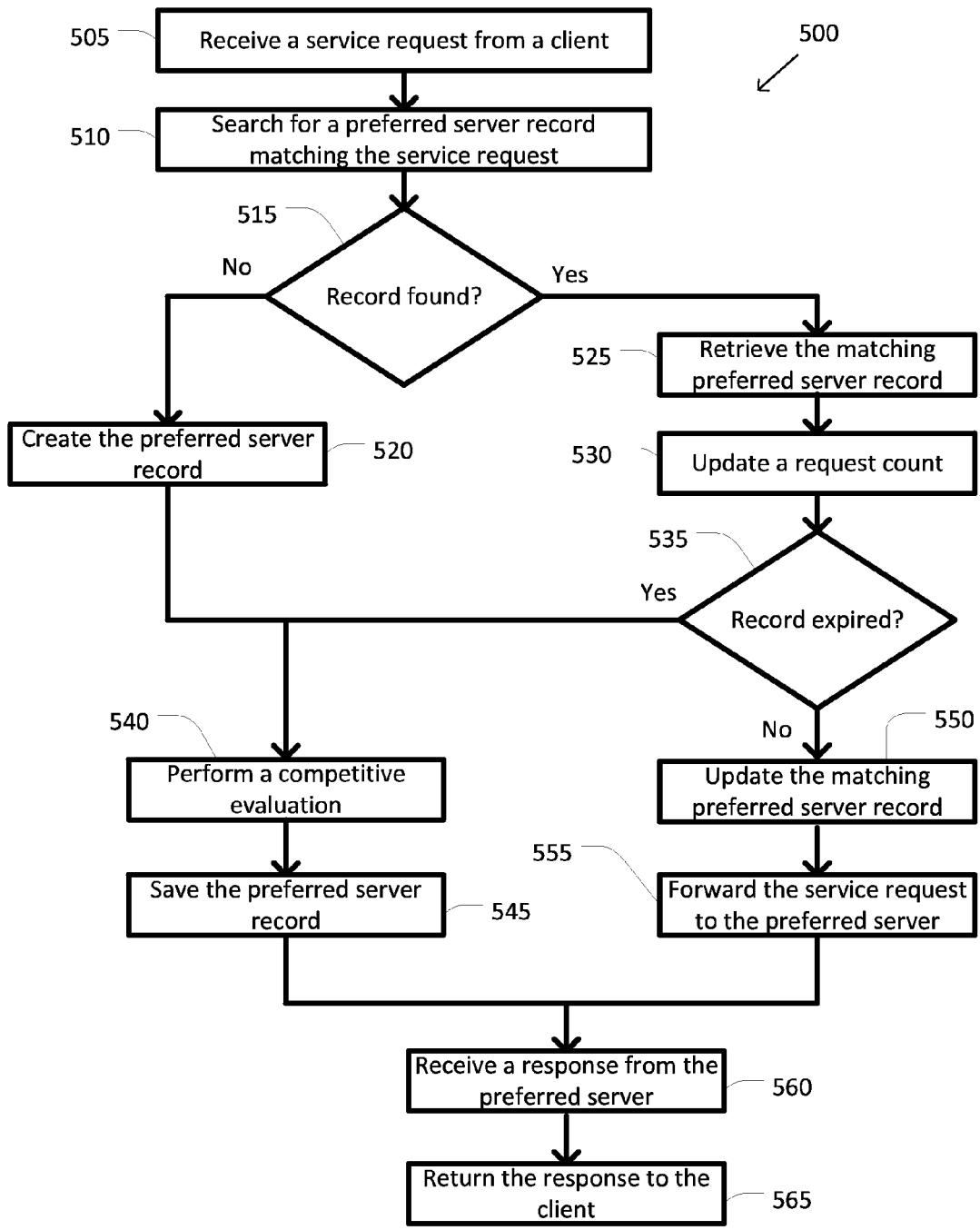
FIG. 5 is a simplified diagram of a method of processing a service request according to some examples.

FIG. 5 is a simplified diagram of a method 500 of processing a service request according to some examples. In some examples, one or more of the processes 505-565 of method 500 may be implemented, at least in part, in the form of executable code stored on non-transient, tangible, machine readable media that when run by one or more processors (e.g., one or more processors associated with arbiter 420) may cause the one or more processors to perform one or more of the processes 505-565. In some examples, method 500 may be implemented by arbiter 420 in cooperation with servers 431-439, application servers 441-449, and transaction processors 451-459.

At a process 505, a service request is received from a client. In some examples, the service request may be received by an arbiter, such as arbiter 420. In some examples, the service request may be received from a client, such as any of the clients 111-119, 211-219, and/or 411-419. In some examples, the request for service may be received over a network. In some examples, the service request may be identified by a name and/or a uniform resource locator (URL). In some examples, the service request may ask the application server to execute a service using one or more parameters and/or data included in the service request.

At a process 510, a preferred server record matching the service request is searched for. The service request received during process 505 is examined to determine one or more characteristics of the service request. In some examples, the characteristics may include a client identifier (ID) associated with the client making the service request, a service ID that uniquely identifies the service being requested, and/or the like. Using these determined characteristics, a data structure and/or a database is searched to locate a matching preferred server record. In some examples, a database query and/or the like is used to search for the matching preferred server record. In some examples, the matching record may be included in the data structure and/or the database as a result of a prior competitive evaluation performed as a result of a prior service request matching the same characteristics.

Figure 6:
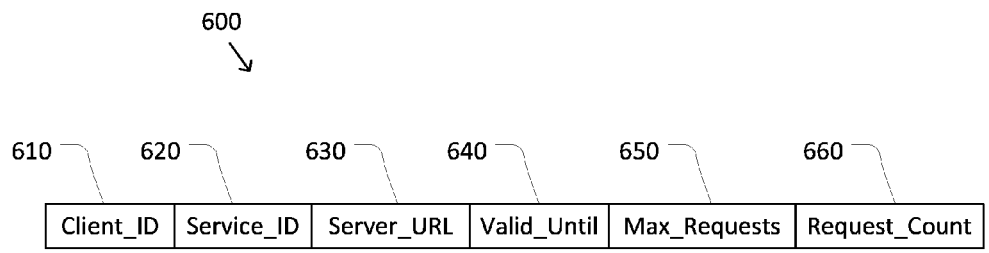
FIG. 6 is a simplified diagram of a preferred server record according to some examples.

An example of a possible preferred server record is now discussed in further detail before returning to the remaining processes of method 500. FIG. 6 is a simplified diagram of a preferred server record 600 according to some examples. As shown in FIG. 6, preferred server record 600 may include several fields including a client_ID field 610, a service_ID field 620, a server_URL field 630, a valid_until field 640, a max_requests field 650, a request_count field 660, as well as other appropriate fields to identify service requests, associate them with preferred servers, manage the competitive evaluation process, and/or the like.

The client_ID field 610 may be used to associate the preferred server with the client making the service request. Because clients often tend to make use of the same services in similar and/or related ways, the server that is most responsive to one service request from the client associated with the client_ID in the client_ID field 610 is more likely to continue to be more responsive to other service requests from the same client. In some examples, the data structure and/or the database may be indexed and/or keyed based on the client_ID field 610.

The service_ID field 620 may be used to associate the preferred server with the particular service requested in the service request. The server that is most responsive in processing the service associated with the service_ID in the service_ID field 620 is more likely to be more responsive to other service requests for the same service. In some examples, the data structure and/or the database may be indexed and/or keyed based on the service_ID field 620.

The server_URL field 630 may be used to identify the preferred server associated with the preferred server record 600. In some examples, the server_URL field 630 may include an IP address of the preferred server, a TCP port of requested service, a locator for a web services definition language (WSDL) definition file, and/or the like. The arbiter may use the server_URL field 630 to direct the service request to the preferred server.

The valid_until field 640 may be used to indicate when the preferred server record 600 is set to expire. Because workloads are constantly changing in servers and/or for the resources used to process a service request, the competitive evaluation process is performed periodically. The valid_until field 640 may be used to indicate when the preferred server record 600 expires and is not longer to be used to identify a preferred server. In some examples, the valid_until field 640 may include a timestamp. In some examples, the valid_until field 640 may be initially set to a desired time interval beyond the time of the last competitive evaluation associated with the preferred server record 600. In some examples, the desired time interval may range from 1 to 60 minutes. In some examples, when the valid_until field 640 is not used it may be left blank, marked null, and/or assigned a similar value designating that the valid_until field 640 is unused.

The max_requests field 650 may be used to indicate how many times the preferred server record 600 may be used to identify the preferred server before preferred server record 600 expires. In some examples, when a preferred server is used several times in succession to execute the same service, there is a higher likelihood that the same resources may be used repeatedly and increase the workload on those resources. Consequently, it may be appropriate to repeat the competitive evaluation of frequently requested services more often than less frequently requested services. In some examples, the max_requests field 650 may be set based on the number of servers and/or the number of clients that are using the arbiter. In some examples, the max_requests field 650 may range from 10 to several hundred. In some examples, when the max_requests field 650 is not used it may be left blank, marked null, and/or assigned a similar value designating that the max_requests field 650 is unused.

The request_count field 660 may be used to retain a running count of the number of times the preferred server record 600 has been used to identify a preferred server. In some examples, the max_requests field 650 and the request_count field 660 may alternatively be replaced by a count-down field that indicates the number of times the preferred server record 600 may be used before it expires. Each time the preferred server record 600 is used to identify a preferred server, the count-down field may be decremented. In some examples, when the request_count field 660 is not used it may be left blank, marked null, and/or assigned a similar value designating that the request_count field 660 is unused.

Referring back to FIG. 5 and process 510, in some examples, one or more of the client_ID field 610 and/or the service_ID field 620 may be matched to the corresponding characteristics of the service request. When a preferred server record includes a client_ID in client_ID field 610 and/or a service_ID in service_ID field 620 that match the corresponding characteristics of the service request, the preferred server identified in the server_URL field 630 may be selected as the server to process the service request received during process 505.

At a process 515, it is determined whether the matching preferred server record is found in the data structure and/or the database. When the matching preferred server record is found it is used to identify a preferred server for the service request beginning with a process 525. When the matching preferred server record is not found, a preferred server record is created beginning with a process 520.

At the process 520, the preferred server record is created. Using the characteristics of the service request determined during process 510, the created preferred server record is associated with the client making the service request and/or the service identified in the service request. In some examples, when the preferred server record 600 is used, at least one of the client_ID field 610 and/or the service_ID field 620 are initialized based on the determined characteristics. The remainder of the created preferred server record is completed following the competitive evaluation that begins with a process 540.

At the process 525, the matching preferred server record is retrieved. The matching preferred server record found during the search of process 510 is retrieved so that it may be updated to record the current request for the corresponding service and/or to determine whether the preferred server record is expired and is updated based on another competitive evaluation.

At a process 530, a request count is updated. Each time the matching preferred server record is used to identify a preferred server, that use is recorded. When the preferred server record includes a count-down field, the count-down field may be decremented. When the preferred server record 600 is used, the request_count field 660 may be incremented.

Figure 7:
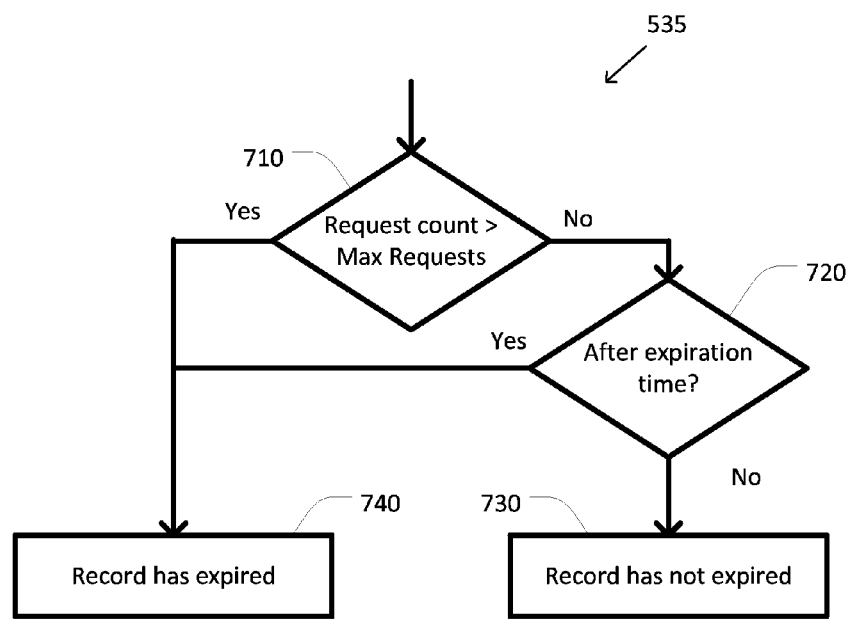
FIG. 7 is a simplified diagram of a process for determining whether a preferred server record is expired according to some examples.

At a process 535, it is determined whether the matching preferred server record is expired. Before the preferred server record retrieved during process 525 is used to identify the preferred server, it is first checked to determine whether it is expired and needs to be updated by another competitive evaluation. In some examples, the determination of process 535 may be designed so that a further competitive analysis is not triggered until a service request is received after the preferred server record expires. This avoids performing the further competitive analysis until continued use of the service is requested by a client. FIG. 7 is a simplified diagram of process 535 for determining whether a preferred server record is expired according to some examples.

At a process 710, it is determined whether the request count for the preferred server record is greater than the maximum number of allowed requests. When the preferred server record includes a count-down field, this may be determined when the count-down field reaches zero and/or becomes negative. When the preferred server record 600 is used, this may be determined by comparing the request_count field 660 to the max_requests field 650. When request counts are not included in the preferred server record, it may be determined, by default, that the request count does not exceed the maximum number of allowed requests. When the request count exceeds the maximum number of allowed requests, the preferred server record is determined to be expired using a process 740. When the request count does not exceed the maximum number of allowed requests, the preferred server record is further evaluated beginning with a process 720.

At the process 720, it is determined whether the current time is after an expiration time for the preferred server record. When the preferred server record 600 is used, this may be determined by comparing the current time to the valid_until field 640. When the preferred server record does not include an expiration time, it may be determined, by default, that the current time is prior to the expiration time. When the current time is after the expiration time, the preferred server record is determined to be expired using the process 740. When the current time is before the expiration time, the preferred server record is determined to not be expired using a process 730.

Referring back to FIG. 5 and process 535, when the preferred server record is determined to be expired, a competitive evaluation is performed beginning with the process 540. When the preferred server record is determined to not be expired, the preferred server record is used to determine the preferred server using a process 550.

Figure 8:
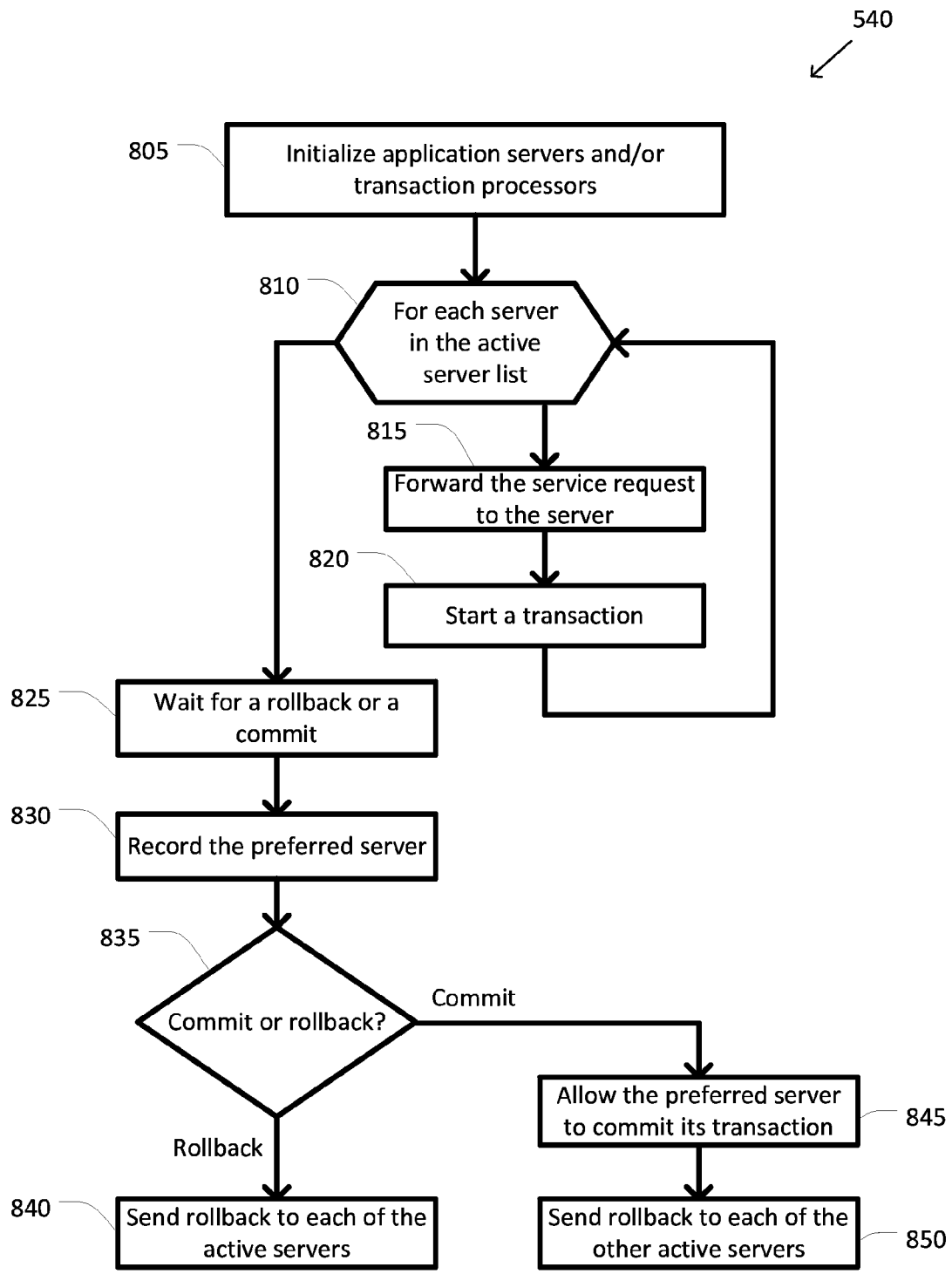
FIG. 8 is a simplified diagram of a process for performing a competitive evaluation according to some examples.

At the process 540, a competitive evaluation is performed. The competitive evaluation includes sending the service request received during process 505 to two or more servers, such as any of the servers 431-439. FIG. 8 is a simplified diagram of process 540 for performing a competitive evaluation according to some examples.

At a process 805, application servers and/or transaction processors are initialized. To support competitive evaluation among two or more servers, a list of active or candidate servers is first determined. The application servers hosted by each of the active servers and/or the one or more transaction processors used by the application servers are initialized and/or setup to support the monitoring and/or supervision of the transaction rollback and/or commit requests by the arbiter. In some examples, the arbiter may send one or more instructions to the application servers and/or the one or more transaction processors. In some examples, the one or more transaction processors are enhanced so that the rollback and/or the commit operations may consult with the arbiter before allowing those operations to complete. In some examples, a competitive evaluation resource is added to each transaction through either the application servers and/or the one or more transaction processors. In some examples, the application servers may be similar to application servers 441-449. In some examples, the one or more transaction processors may be similar to transaction processors 451-459. When each of the application servers and/or the one or more transaction processors are initialized, the arbiter may assemble a list of active servers that support the competitive evaluation process.

At a process 810, each of the servers in the active server list is iterated through. The service request that forms the basis of the competitive evaluation, such as the service request received during process 505, is then forwarded to each server that is to be competitively evaluated using a process 815. The service request may be forwarded to each server over a network. In some examples, the service request may be directed to the application server being hosted on the respective server.

In some examples, the process may be received at the server and/or the application server using a process similar to process 310. As the application server begins to perform the requested service, a corresponding transaction may be started using a process 820. In some examples, process 820 may be similar to process 320. Once the service request is forwarded to each of the active servers and the respective processing begins, the arbiter waits while the competitive evaluation takes place.

At a process 825, the arbiter waits for notice of a rollback or a commit to take place. The arbiter waits until the first of the active servers that was forwarded the service request during process 815 completes processing of the service request and makes a transaction ending request such as a rollback request or operation and/or a commit request or operation. The first of the active servers to complete the processing of the service request is considered to be the most responsive server for the service request and becomes the preferred server. The arbiter determines the preferred server by waiting for the first of the active servers to initiate a rollback or a commit operation that occurs at the end of the processing for the service request. In some examples, the arbiter is notified of the rollback and/or the commit operation by the transaction processor based on the mechanisms initialized during process 805.

At a process 830, the preferred server is recorded. The preferred server determined during process 825 is recorded in the preferred server record. In some examples, identify of the preferred server may be determined from information associated with the rollback and/or the commit request received during process 825. In some examples, the preferred server is recorded using the server_URL field 630.

At a process 835, it is determined whether the transaction-ending request received during process 825 is a rollback or a commit request. When the transaction-ending request is a commit request, this indicates that the preferred server was able to successfully process the service request and is asking to complete its processing of the service request. This case is handled beginning with a process 845. When the transaction-ending request is a rollback request, this indicates that the preferred server was not able to complete its processing of the service request. Under the assumption that if one server is not able to complete the service request then the same business logic for the service in the other servers will reach the same conclusion, each of the servers is instructed to rollback their respective transaction using a process 840.

At the process 840, a rollback is sent to each of the active servers. Once the preferred server fails to complete processing of the service request and initiates a rollback operation, each of the active servers that are being competitively evaluated, including the preferred server, are instructed and/or requested to roll back the respective transaction wrapping their version of the service request. In some examples, the preferred server may be notified right away in response to the rollback request received during process 825. In some examples, as each of the other active servers reaches the end of its respective processing of the service request, a corresponding rollback request may be received by the arbiter from the one or more transaction processors and the arbiter may instruct the one or more transaction processors to allow the rollback to occur. In some examples, once each of the active servers involved in the competitive evaluation rolls back their respective transactions, the competitive evaluation completes. In some examples, process 840 may continue to execute as a background and/or a threaded process so that the preferred server record may be updated and the rest of method 500 may complete, even though each of the active servers have not yet completed their respective processing of the service request.

At the process 845, the preferred server is allowed to commit its transaction. By making its commit request first, the preferred server is permitted to complete the requested commit operation and becomes the only active server allowed to perform a commit on its respective transaction wrapping the service request.

At a process 850, a rollback is sent to each of the other active servers. Once the preferred server completes its processing of the service request and commits its respective transaction, the other active servers that are also processing the service request are instructed and/or requested to rollback their respective transaction wrapping their version of the service request. In some examples, as each of the other active servers reaches the end of its respective processing of the service request, a corresponding rollback and/or commit request may be received by the arbiter from the one of the transaction processors and the arbiter instructs that transaction processor to force a rollback to occur. In some examples, once each of the other active servers involved in the competitive evaluation rolls back their respective transactions, the competitive evaluation completes. In some examples, process 850 may continue to execute as a background and/or a threaded process so that the preferred server record may be updated and the rest of method 500 may complete, even though each of the active servers have not yet completed their respective processing of the service request.

Referring back to FIG. 5 and process 540, as result of the competitive evaluation, the preferred server for the service request received during process 505 is determined. The matching preferred server record retrieved during process 525 or the preferred server record created during process 520 is updated to include information associated with the preferred server. In some examples, an address and/or URL for the preferred server may be stored in the server_URL field 630. In some examples, the preferred server record may be further updated with expiration information associated with the preferred server record. In some examples, the request_count field 660 may be set to one and the max_requests field 650 may be set to a maximum number of allowed requests before another competitive evaluation should take place. In some examples, a count-down field of the preferred server record may be set to the maximum number of allowed requests. In some examples, the maximum number of allowed requests may range from 10 to several hundred. In some examples, the valid_until field 640 may be set to the current time plus a desired time interval. In some examples, the desired time interval may range from 1 to 60 minutes.

At a process 545, the preferred server record is saved. The preferred server record, along with information associated with the preferred server and/or the expiration information determined during process 540 is saved in the data structure and/or the database searched during process 510. Processing of the service request received during process 505 then completes beginning with a process 560.

At the process 550, the matching preferred server record is updated. The matching preferred server record retrieved during process 525 is saved in the data structure and/or the database from which it was retrieved and replaces the previous version of the matching preferred server record in the data structure and/or database.

At a process 555, the service request is forwarded to the preferred server. The service request received during process 505 is forwarded to the preferred server associated with the matching preferred server record. In some examples, the preferred server may be determined based on information stored in the server_URL field 630 of the matching preferred server record. In some examples, the application server in the preferred server receives the forwarded service request and begins processing of the service request. In some examples, the service request may be wrapped in a transaction using a method similar to method 300. In some examples, a transaction ending request at the end of the processing associated with the service request may be monitored by the arbiter. In some examples, the arbiter may allow the transaction ending request to finish without forcing a rollback as there is no competitive evaluation taking place. Processing of the service request then completes beginning with the process 560.

At the process 560, a response is received from the preferred server. Once processing of the service request completes in the preferred server, the preferred server may return a response. The response may include a final result and/or a final status of the service request. In some examples, because the preferred server received the service request from the arbiter, the response may be returned to the arbiter.

At a process 565, the response is returned to the client. The response received from the preferred server is returned to the client from which the service request was received during process 505.

Figure 9:
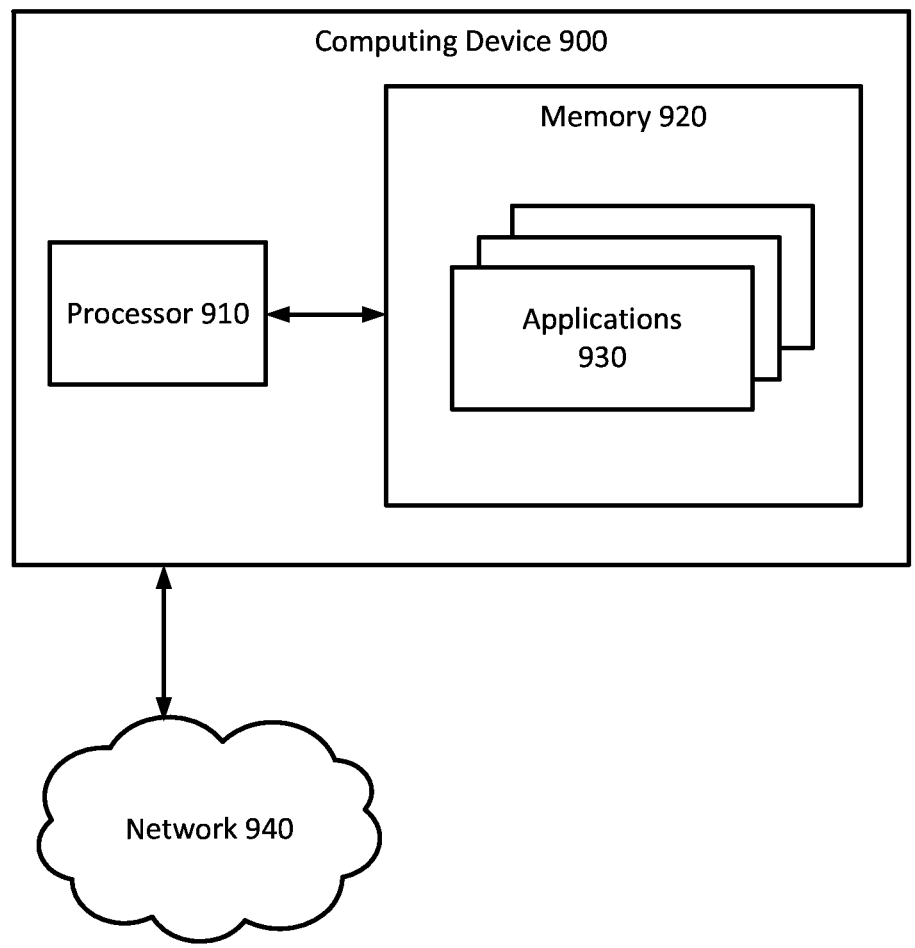
FIG. 9 is a simplified diagram of a computing device according to some examples.

FIG. 9 is a simplified diagram of a computing device 900 according to some examples. Computing device 900 may be any suitable workstation, cluster, server, virtual machine, and/or the like. Computing device 900 includes a processor 910 coupled to memory 920. In some examples, processor 910 may control operation and/or execution of hardware and/or software on computing device 900. Although only one processor 910 is shown, computing device 900 may include multiple processors, multi-core processors, and/or the like. In some examples, computing device 900 may also be coupled to one or more other computing devices via a network 940. Network 940 may be any kind of network including a local area network (LAN), such as an Ethernet, and/or a wide area network (WAN), such as the internet.

Memory 920 may be used to store one or more applications 930 that may be executed by processor 910. The one or more applications 930 may include one or more of any of the various applications and/or subsystems described in greater detail above with respect to FIGS. 3-8. These one or more applications 930 may include any of the application servers, the one or more transaction processors 440, the arbiter 420, and/or one or more of the clients 411-419. In some examples, the same computing device 900 may be used to host the arbiter 420 alone or the arbiter 420 along with transaction processor 440. In some examples, each of the computing devices 900 hosting an application server may host its own transaction processor 440. In some examples, the one or more transaction processors 440 may be hosted in separate computing devices 900. In some examples, separate virtual machines hosted on the same computing device 900 may be used to separately host each of the one or more applications 930. The combinations of computing devices 900 and applications 930 are very flexible and may be adjusted to suit the needs of cloud computing and/or the like.

Some examples of computing device 900 associated with arbiter 420 may include non-transient, tangible, machine readable media (e.g., memory 920) that includes executable code that when run by one or more processors (e.g., processor 910) may cause the one or more processors to perform the processes of method 500 as described above. Some common forms of machine readable media that may include the processes of method 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of processing a service request, the method comprising:
    receiving the service request at an arbiter running on a computing device, the service request being received from a client;
    determining whether the service request is associated with a preferred server;
    when the service request is not associated with the preferred server:
        using the arbiter to coordinate a competitive evaluation among a plurality of active servers by sending the service request in parallel to each of the plurality of active servers;
        selecting as the preferred server a first one of the active servers that completes processing of the service request before the others;
        preventing others of the active servers other than the first one of the active servers from completing processing of the service request;
        associating the preferred server with the service request;
        receiving a response to the service request from the preferred server; and
        returning the response to the client.

2. The method of claim 1 wherein determining whether the service request is associated with the preferred server comprises searching for a preferred server record matching one or more characteristics of the service request.

3. The method of claim 2 wherein the one or more characteristics are each selected from a group consisting of a client identifier associated with the client and a service identifier associated with a service requested in the service request.

4. The method of claim 2 wherein determining whether the service request is associated with the preferred server further comprises determining whether the preferred server record is expired.

5. The method of claim 4 wherein determining whether the preferred server record is expired comprises determining that the preferred server record is expired when a current time is after an expiration time associated with the preferred server record.

6. The method of claim 5 wherein the expiration time is stored in a valid until field of the preferred server record.

7. The method of claim 5 wherein the expiration time is between one and sixty minutes after a time of a last competitive evaluation that selected the preferred server.

8. The method of claim 4 wherein determining whether the preferred server record is expired comprises determining that the preferred server record is expired when a number of times the preferred server record has been used to determine the preferred server exceeds a threshold.

9. The method of claim 8 wherein the threshold is selected from a range from 10 to 200.

10. The method of claim 1 wherein associating the preferred server with the service request comprises saving a preferred server record in a data structure or a database.

11. The method of claim 1 wherein using the arbiter to coordinate the competitive evaluation among the plurality of active servers comprises:
    sending initialization instructions to an application server or a transaction processor associated with each of the active servers so that the arbiter is notified of rollback operations and commit operations initiated on the active servers;
    forwarding the service request to each of the active servers; and
    waiting for a first notification that the first one of the active servers has initiated a first rollback operation or a first commit operation;
    wherein the first notification is received prior to any second notification that any other of the active servers has initiated a respective second rollback operation or a respective second commit operation.

12. The method of claim 11 wherein using the arbiter to coordinate the competitive evaluation among the plurality of active servers further comprises confirming, by the arbiter, that the first rollback operation or the first commit operation is allowed to complete.

13. The method of claim 12 wherein using the arbiter to coordinate the competitive evaluation among the plurality of active servers further comprises returning, by the arbiter, an instruction that each of the other of the active servers perform a rollback when each respective second notification is received.

14. The method of claim 1, further comprising updating a request count in a preferred server record associated with the service request when the service request is associated with the preferred server.

15. A system for processing service requests, the system comprising:
    a computing device comprising one or more processors coupled to memory; and
    an arbiter stored in the memory and executed by the one or more processors;
    wherein the computing device is configured to communicate with a client and a plurality of active servers;
    wherein the arbiter is configured to:
        receive a service request from the client;
        determine whether the service request is associated with a preferred server;
        forward the service request to the preferred server when the service request is associated with the preferred server;
        when the service request is not associated with the preferred server:
            coordinate a competitive evaluation among the plurality of active servers by sending the service request in parallel to each of the plurality of active servers;
            select as the preferred server a first one of the active servers that completes processing of the service request before the others;
            prevent others of the active servers other than the first one of the active servers from completing processing of the service request; and
            associate the preferred server with the service request;

receive a response to the service request from the preferred server; and
return the response to the client.

16. The system of claim 15 wherein:
the arbiter is further configured to:
send initialization instructions to an application server or a transaction processor associated with each of the active servers so that the arbiter is notified of rollback operations and commit operations initiated on the active servers;
forward the service request to each of the active servers; and
wait for a first notification that the first one of the active servers has initiated a first rollback operation or a first commit operation; and
wherein the first notification is received prior to any second notification that any other of the active servers has initiated a respective second rollback operation or a respective second commit operation.

17. The system of claim 16 wherein the arbiter is further configured to:
confirm that the first rollback operation or the first commit operation is allowed to complete; and
return an instruction that each of the other of the active servers perform a rollback when each respective second notification is received.

18. A non-transitory machine-readable medium comprising a first plurality of machine-readable instructions which when executed by one or more processors associated with an arbiter are adapted to cause the one or more processors to perform a method comprising:
receiving a first request from a client;
determining whether the first request is associated with a first server by matching one or more properties of the first request to a corresponding one or more fields of a server record associated with the first server;
when the first request is not associated with the first server:
using the arbiter to coordinate a competitive evaluation among a plurality of second servers by sending the first request in parallel to each of the plurality of second servers;
selecting as the first server a first one of the second servers that completes handling of the first request before any other of the second servers;
preventing others of the second servers other than the first server from completing processing of the first request;
associating the first server with the first request;
receiving a response to the first request from the first server; and
returning the response to the client.

19. The non-transitory machine-readable medium of claim 18, further comprising a second plurality of machine-readable instructions which when executed by the one or more processors are adapted to cause the one or more processors to perform a method comprising:
sending setup instructions to an application server or a transaction manager associated with each of the second servers so that the arbiter is notified of any transaction ending requests made on the second servers;
forwarding the first request to each of the second servers;
waiting for a first notification that the first one of the second servers has made a first transaction ending request; and
recording the first server in a server field of the server record;
wherein the first notification is received prior to any second notification that any other of the second servers has made a respective second transaction ending request;
wherein the first transaction ending request and the second transaction ending request are each selected from a group consisting of a rollback request and a commit request.

20. The non-transitory machine-readable medium of claim 19, further comprising a third plurality of machine-readable instructions which when executed by the one or more processors are adapted to cause the one or more processors to perform a method comprising:
confirming that the first transaction ending request is allowed to complete; and
responding to each second notification by requesting that the corresponding second server associated with the second notification perform a rollback operation.

* * * * *